(12) United States Patent
Li et al.

(10) Patent No.: US 11,128,661 B2
(45) Date of Patent: Sep. 21, 2021

(54) TERMINAL MATCHING METHOD AND APPARATUS

(71) Applicant: Huawei Technologies Co., Ltd., Shenzhen (CN)

(72) Inventors: Xiaoxian Li, Shenzhen (CN); Ping Fang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 195 days.

(21) Appl. No.: 16/474,890

(22) PCT Filed: Dec. 31, 2016

(86) PCT No.: PCT/CN2016/114060
§ 371 (c)(1),
(2) Date: Jun. 28, 2019

(87) PCT Pub. No.: WO2018/120247
PCT Pub. Date: Jul. 5, 2018

(65) Prior Publication Data
US 2019/0349397 A1 Nov. 14, 2019

(51) Int. Cl.
*H04L 29/06* (2006.01)
*H04W 12/71* (2021.01)
(Continued)

(52) U.S. Cl.
CPC ....... *H04L 63/1475* (2013.01); *H04W 12/108* (2021.01); *H04W 12/121* (2021.01);
(Continued)

(58) Field of Classification Search
CPC .............. H04L 63/1475; H04W 12/71; H04W 12/108; H04W 12/121; H04W 12/02; H04W 84/12
See application file for complete search history.

(56) References Cited

U.S. PATENT DOCUMENTS 7,325,132 B2 * 1/2008 Takayama .............. G06Q 20/04
705/64
2005/0268107 A1 * 12/2005 Harris ................. H04L 63/0861
713/182
(Continued)

FOREIGN PATENT DOCUMENTS

CN 101588345 A 11/2009
CN 104955038 A 9/2015
(Continued)

*Primary Examiner* — Abu S Sholeman
(74) *Attorney, Agent, or Firm* — Slater Matsil, LLP

(57) ABSTRACT

A method includes: obtaining, by a second terminal, an interface address of a first terminal, where the interface address of the first terminal is MAC1; receiving, by the second terminal, a first message sent by the first terminal, where an interface address of the first terminal in the first message is MAC3 obtained after a change, and the first message includes first identification information; and comparing, by the second terminal, the first identification information with second identification information, and if the first identification information is consistent with the second identification information, determining, by the second terminal, that the MAC3 in the first message and the MAC1 that is obtained by the second terminal are used to identify a same device, where the same device is the first terminal.

17 Claims, 12 Drawing Sheets

(51) Int. Cl.
H04W 12/108 (2021.01)
H04W 12/121 (2021.01)
H04W 84/12 (2009.01)
H04W 12/02 (2009.01)

(52) U.S. Cl.
CPC ............ H04W 12/71 (2021.01); H04W 12/02 (2013.01); H04W 84/12 (2013.01)

(56) References Cited

U.S. PATENT DOCUMENTS

| | | | |
|---|---|---|---|
| 2006/0288209 A1* | 12/2006 | Vogler | H04L 9/0844 713/168 |
| 2007/0019609 A1 | 1/2007 | Anjum | |
| 2007/0083750 A1* | 4/2007 | Miura | G06F 21/445 713/155 |
| 2009/0193253 A1 | 7/2009 | Falk et al. | |
| 2011/0191664 A1* | 8/2011 | Sheleheda | G06F 17/00 715/205 |
| 2011/0208850 A1* | 8/2011 | Sheleheda | G06F 16/9535 709/223 |
| 2014/0133656 A1 | 5/2014 | Wurster et al. | |
| 2016/0026822 A1* | 1/2016 | Weis | G06F 21/6245 726/28 |
| 2016/0088558 A1 | 3/2016 | Chu et al. | |
| 2016/0344712 A1* | 11/2016 | Ding | H04L 63/061 |
| 2017/0012977 A1 | 1/2017 | Li et al. | |
| 2017/0201506 A1 | 7/2017 | Pang et al. | |
| 2017/0201930 A1 | 7/2017 | Chen et al. | |
| 2017/0223754 A1 | 8/2017 | Li et al. | |

FOREIGN PATENT DOCUMENTS

| | | |
|---|---|---|
| CN | 105451222 A | 3/2016 |
| CN | 105530681 A | 4/2016 |

* cited by examiner

TERMINAL MATCHING METHOD AND APPARATUS

CROSS-REFERENCE TO RELATED APPLICATIONS

This application is a national stage of International Application No. PCT/CN2016/114060, filed on Dec. 31, 2016, which is hereby incorporated by reference in its entirety.

TECHNICAL FIELD

This application relates to the communications field, and in particular, to a terminal matching method and apparatus.

BACKGROUND

A wireless local area network (WLAN) can provide a wireless data transmission service for terminals within limited coverage. In a WLAN based on IEEE 802.11, namely, wireless fidelity (Wi-Fi), a terminal can access the Internet by using a device such as a gateway. The Wi-Fi is widely applied in various industries due to its advantages such as fast deployment, convenient use, and a high transmission rate. Access points for Wi-Fi networks are distributed throughout places such as hotels, cafes, schools, and hospitals.

Wi-Fi addressing is performed based on a media access control (MAC) address, and a Wi-Fi system may include two types of devices: an access point (AP) and a station (STA). Specifically, an AP may be connected to one or more stations through the Wi-Fi. For example, in a wearable device scenario shown in FIG. 1a, a wearable device such as a bracelet, a watch, glasses, a necklace, an accessory, or shoes with a Wi-Fi communications module may be connected to a smart terminal of a user, for example, a mobile phone or a tablet. The smart terminal may be used as an AP of the Wi-Fi system, and the wearable device is used as a STA of the Wi-Fi system.

In the Wi-Fi system, messages are exchanged between the STA and the AP through a WLAN air interface. A MAC message header (MAC Header) of a message received or sent through the WLAN air interface may carry a receiver address (RA) and a transmitter address (TA). Both the RA and the TA are usually fixed MAC addresses in a relatively long period of time. During information interaction, if an eavesdropper exists, the eavesdropper may obtain a MAC address of a message receiver and a MAC address of a message transmitter by receiving and analyzing a message packet through an air interface. The eavesdropper may obtain privacy information such as a frequent place or time point of a user of a terminal by tracking a MAC address of the terminal (a message receiver or a message transmitter), and further obtain privacy information such as a living habit, hobbies, interests, or even a social relationship of the terminal user through massive data analysis. As a result, an existing interactive manner of the Wi-Fi system may cause user information disclosure, and reduce security of the Wi-Fi.

SUMMARY

A technical problem to be resolved in embodiments of this application is to provide a terminal matching method and apparatus, to resolve a prior-art problem of low Wi-Fi security.

According to a first aspect, a terminal matching method is provided, and the method includes the following steps: obtaining, by a second terminal, an interface address of a first terminal at a first time point, where the interface address of the first terminal is a first media access control address MAC1, and an interface address of the second terminal at the first time point is a second media access control address MAC2; receiving, by the second terminal at a second time point following the first time point, a first message sent by the first terminal, where a transmitter address, namely, the interface address of the first terminal, included in the first message is a third media access control address MAC3 obtained after a change, the first message includes first identification information, the first identification information is information obtained through calculation after the first terminal inputs the MAC1, the MAC2, and secret information into a first preset irreversible algorithm, and the secret information is information shared by the first terminal and the second terminal; comparing, by the second terminal, the first identification information with second identification information, and if the first identification information is consistent with the second identification information, determining, by the second terminal, that the MAC3 in the first message and the MAC1 that is obtained by the second terminal are used to identify a same device, where the same device is the first terminal, and the second identification information is information obtained through calculation after the second terminal inputs the MAC1, the MAC2, and the secret information into the first preset irreversible algorithm; and sending, by the second terminal, a response message for the first message to the first terminal, where the response message carries a fourth media access control address MAC4, and the MAC4 is a changed interface address of the second terminal.

In a technical solution provided in the first aspect, the generated first identification information is used to match the first terminal device. In this way, after the MAC address of the first terminal device is changed, a peer end device such as the second terminal device may use the first identification information to identify a changed MAC address as the MAC address of the first terminal. Even if an eavesdropper obtains the first identification information, because the first identification information is obtained through calculation according to an irreversible algorithm, the eavesdropper cannot obtain the secret information by using the first identification information. Therefore, the eavesdropper can obtain only user information existing in a period of time, cannot obtain entire user information, and cannot track user privacy (for example, location information), thereby improving Wi-Fi security.

In an optional solution, the method further includes: the response message for the first message carries third identification information, where the third identification information is information obtained through calculation after the second terminal inputs the MAC1, the MAC2, and the secret information into a second preset irreversible algorithm. In the solution, the third identification information in the response message for the first message is used to notify the first terminal that the second terminal is a device corresponding to the MAC2.

In another optional solution, the method further includes: receiving, by the second terminal, a second message sent by the first terminal, where the second message includes a confirmation indication that the first terminal determines that the MAC4 is the interface address of the second terminal; and sending, by the second terminal, a response message for the second message to the first terminal when the second message includes the confirmation indication. In the solution, a notification solution of a MAC address change of the second terminal is provided, thereby changing an address of the second terminal.

In still another optional solution, the second terminal detects whether the MAC1 conflicts with a media access control address within a communication range of the second terminal, and if detecting a conflict of the MAC1, the second terminal sends a third message to the first terminal, where the fifth message carries a media access control address conflict indication. In the solution, MAC address conflict detection is implemented, and a MAC address conflict is avoided.

In still another optional solution, if the first message, the second message, the third message, or the fourth message is a management frame, the first identification information, the second identification information, the third identification information, or fourth identification information is added to an anti-tracking information element of a load part in the management frame, where the anti-tracking information element includes an element identifier and the identification information; or if the first message, the second message, the third message, or the fourth message is a management frame or a control frame, and a subtype field of the management frame or the control frame indicates that the frame is a frame of an anti-tracking type, the first identification information, the second identification information, the third identification information, or fourth identification information is added to a load part of the management frame or the control frame. In the solution, a specific location of the identification information in the message is provided, and implementation of the technical solution of the first aspect is supported.

In still another optional solution, if the first terminal is a source device, the first message is a data frame, and a subtype field of the data frame indicates that the frame is an anti-tracking data frame, the first identification information is added to an A3 field of the data frame. In the solution, another specific location of the identification information in the message is provided, and implementation of the technical solution of the first aspect is supported.

In still another optional solution, if the second terminal is a destination device, and the response message for the first message is a data frame, a subtype field of the data frame is set to an anti-tracking data frame, and the second identification information is added to an A4 field of the data frame. In the solution, still another specific location of the identification information in the message is provided, and implementation of the technical solution of the first aspect is supported.

According to a second aspect, a matching apparatus is provided, the matching apparatus is disposed in a second terminal, and the apparatus includes: an obtaining unit, configured to obtain an interface address of a first terminal at a first time point, where the interface address of the first terminal is a first media access control address MAC1, and an interface address of the second terminal at the first time point is a second media access control address MAC2; a transceiver unit, configured to receive, at a second time point following the first time point, a first message sent by the first terminal, where a transmitter address, namely, the interface address of the first terminal, included in the first message is a third media access control address MAC3 obtained after a change, the first message includes first identification information, the first identification information is information obtained through calculation after the first terminal inputs the MAC1, the MAC2, and secret information into a first preset irreversible algorithm, and the secret information is information shared by the first terminal and the second terminal; and a processing unit, configured to: compare the first identification information with second identification information, and if the first identification information is consistent with the second identification information, the second terminal determines that the MAC3 in the first message and the MAC1 that is obtained by the second terminal are used to identify a same device, where the same device is the first terminal, and the second identification information is information obtained through calculation after the processing unit inputs the MAC1, the MAC2, and the secret information into the first preset irreversible algorithm; where the transceiver unit is further configured to send a response message for the first message to the first terminal, where the response message carries a fourth media access control address MAC4, and the MAC4 is a changed interface address of the second terminal.

In a technical solution provided in the second aspect, the generated first identification information is used to match the first terminal device. In this way, after the MAC address of the first terminal device is changed, a peer end device such as the second terminal device may use the first identification information to identify a changed MAC address as the MAC address of the first terminal. Even if an eavesdropper obtains the first identification information, because the first identification information is obtained through calculation according to an irreversible algorithm, the eavesdropper cannot obtain the secret information by using the first identification information. Therefore, the eavesdropper can obtain only user information existing in a period of time, cannot obtain entire user information, and cannot track user privacy (for example, location information), thereby improving Wi-Fi security.

In optional technical solutions of the second aspect, the transceiver unit and the processing unit provided in the second aspect may be used to perform the foregoing optional technical solutions.

According to a third aspect, a terminal is provided. The terminal is a second terminal and includes: a processor, a wireless transceiver, a memory, and a bus. The processor, the wireless transceiver, and the memory are connected to each other by using the bus. The processor is configured to obtain an interface address of a first terminal at a first time point, where the interface address of the first terminal is a first media access control address MAC1, and an interface address of the second terminal at the first time point is a second media access control address MAC2. The transceiver is configured to receive, at a second time point following the first time point, a first message sent by the first terminal, where a transmitter address, namely, the interface address of the first terminal, included in the first message is a third media access control address MAC3 obtained after a change, the first message includes first identification information, the first identification information is information obtained through calculation after the first terminal inputs the MAC1, the MAC2, and secret information into a first preset irreversible algorithm, and the secret information is information shared by the first terminal and the second terminal. The processor is configured to: compare the first identification information with second identification information, and if the first identification information is consistent with the second identification information, the second terminal determines that the MAC3 in the first message and the MAC1 that is obtained by the second terminal are used to identify a same device, where the same device is the first terminal, and the second identification information is information obtained through calculation after the processor inputs the MAC1, the MAC2, and the secret information into the first preset irreversible algorithm. The transceiver is further configured to send a response message for the first message to the first terminal, where the response message carries a fourth media access control address MAC4, and the MAC4 is a changed interface address of the second terminal.

In a technical solution provided in the third aspect, the generated first identification information is used to match the first terminal device. In this way, after the MAC address of the first terminal device is changed, a peer end device such as the second terminal device may use the first identification information to identify a changed MAC address as the MAC address of the first terminal. Even if an eavesdropper obtains the first identification information, because the first identification information is obtained through calculation according to an irreversible algorithm, the eavesdropper cannot obtain the secret information by using the first identification information. Therefore, the eavesdropper can obtain only user information existing in a period of time, cannot obtain entire user information, and cannot track user privacy (for example, location information), thereby improving Wi-Fi security.

According to a fourth aspect, a terminal matching method is provided, and the method includes the following steps: obtaining, by a second terminal, an interface address of a first terminal at a first time point, where the interface address of the first terminal at the first time point is a first media access control address MAC1; receiving, by the second terminal at a second time point following the first time point, a first message sent by the first terminal, where a transmitter address, namely, the interface address of the first terminal, included in the first message is a third media access control address MAC3 obtained after a change, the first message includes first identification information, the first identification information is information obtained through calculation after the first terminal inputs the MAC1, a second media access control address MAC2, and secret information into a first preset irreversible algorithm, the secret information is information shared by the first terminal and the second terminal, and an interface address of the second terminal is the MAC2 at the first time point and the second time point; comparing, by the second terminal, the first identification information with second identification information, and if the first identification information is consistent with the second identification information, determining, by the second terminal, that the MAC3 in the first message and the MAC1 that is obtained by the second terminal are used to identify a same device, where the same device is the first terminal, and the second identification information is information obtained through calculation after the second terminal inputs the MAC1, the MAC2, and the secret information into the first preset irreversible algorithm; and sending, by the second terminal, a response message for the first message to the first terminal, where the response message carries the MAC2.

In a technical solution provided in the fourth aspect, a MAC address can be randomly changed without the need of confirmation based on information sent by a peer end.

BRIEF DESCRIPTION OF THE DRAWINGS

To describe the technical solutions in the embodiments of this application or in the prior art more clearly, the following briefly introduces the accompanying drawings required in the embodiments. Apparently, the accompanying drawings in the following description show merely some embodiments of this application, and a person of ordinary skill in the art may still derive other drawings from these accompanying drawings.

FIG. 7-2 is a schematic diagram of another format of a message according to this application;

FIG. 7-3 is a schematic diagram of still another format of a message according to this application;

DETAILED DESCRIPTION OF ILLUSTRATIVE EMBODIMENTS

The following clearly and completely describes the technical solutions in the embodiments of this application with reference to the accompanying drawings in the embodiments of this application. Apparently, the described embodiments are merely some but not all of the embodiments of this application.

Figure 1A:
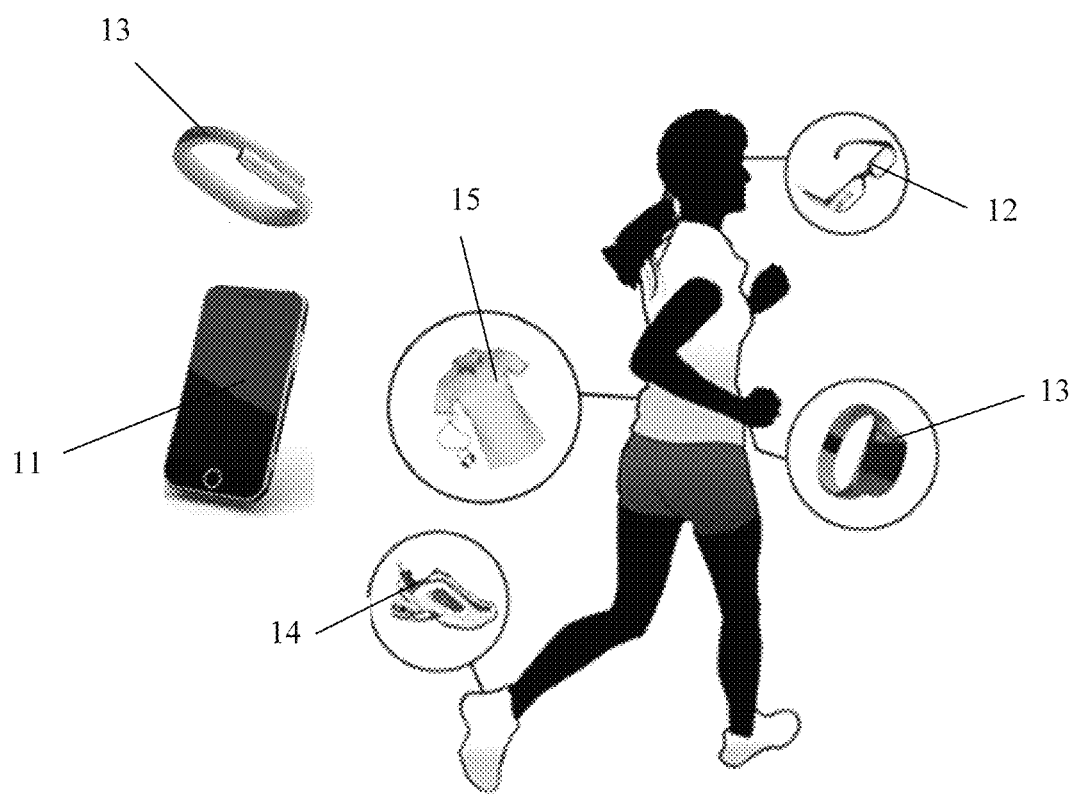
FIG. 1a is a schematic diagram of a wearable device scenario.
Figure 1B:
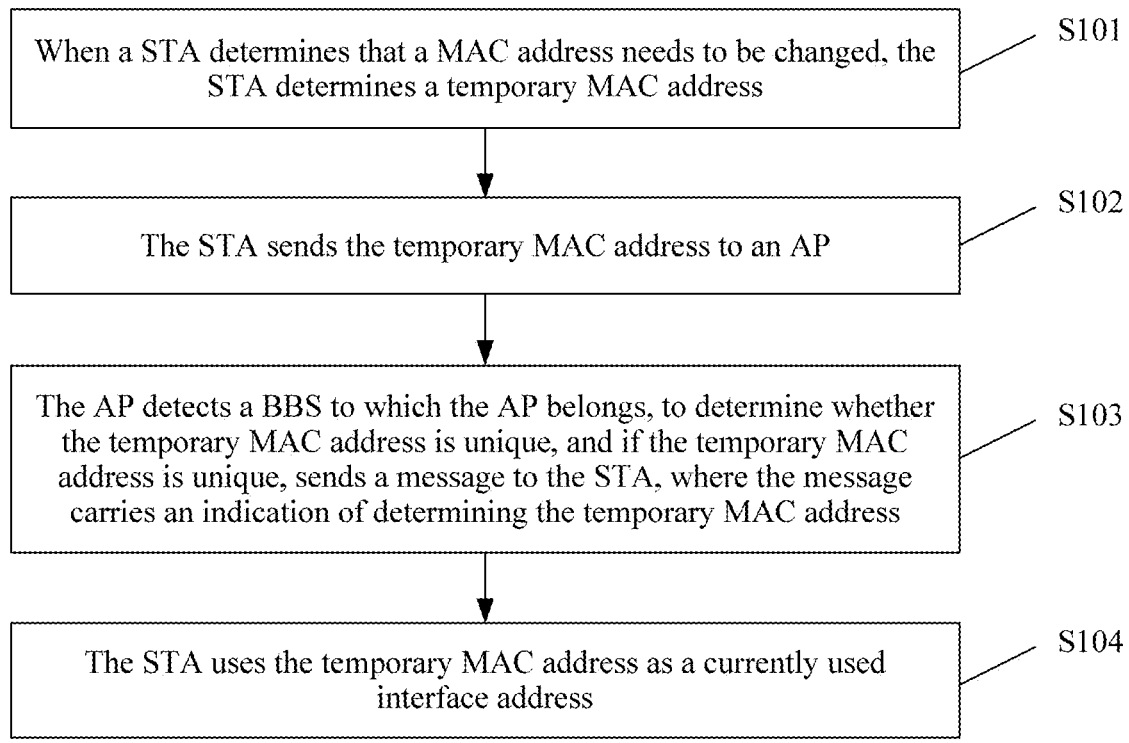
FIG. 1b, is a flowchart of a terminal matching method.
Figure 1C:
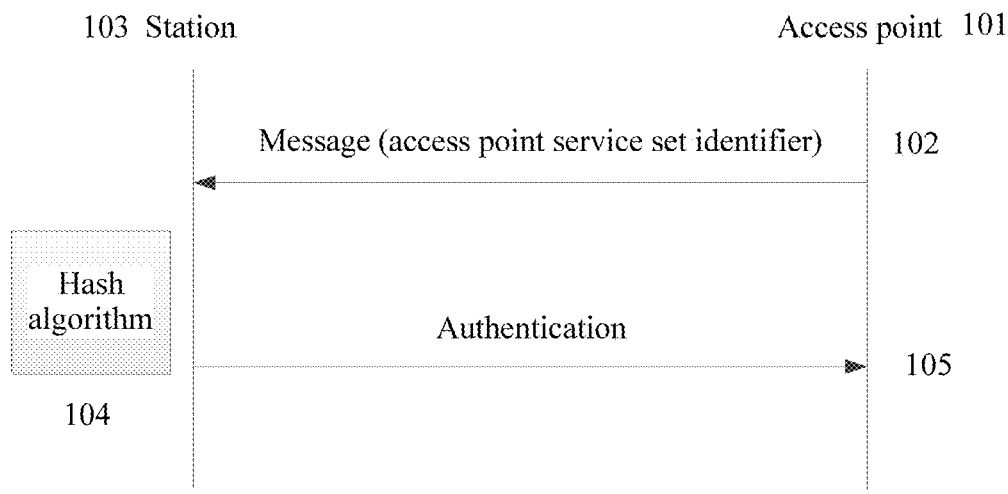
FIG. 1c is a flowchart of a terminal matching method according to the prior art.

FIG. 1b is a flowchart of a prior-art method in which terminals negotiate about a temporary MAC address. The method shown in FIG. 1b may be implemented in a scenario shown in FIG. 1a. As shown in FIG. 1a, a mobile phone 11 may be an AP, all portable wearable devices may be STAs. For example, smart glasses 12, a smart band 13, smart running shoes 14, smart clothes 15 may be STAs. The method includes the following steps.

Step S101: When a STA determines that a MAC address needs to be changed, the STA generates a temporary MAC address.

Step S102: The STA sends the temporary MAC address to an AP.

Step S103: The AP detects a basic service set (English: basic service set, BBS) to which the AP belongs, to determine whether the temporary MAC address is unique; and if the temporary MAC address is unique, sends a message to the STA, where the message carries an indication that the temporary MAC address is determined.

Step S104: The STA uses the temporary MAC address as a currently used interface address.

In the method shown in FIG. 1b, the STA and the AP need to use a dedicated message to agree upon a temporary MAC address. In addition, the STA may change a MAC address only in a BSS to which the STA belongs, and cannot independently change a MAC address according to a rule of the STA.

Figure 2:
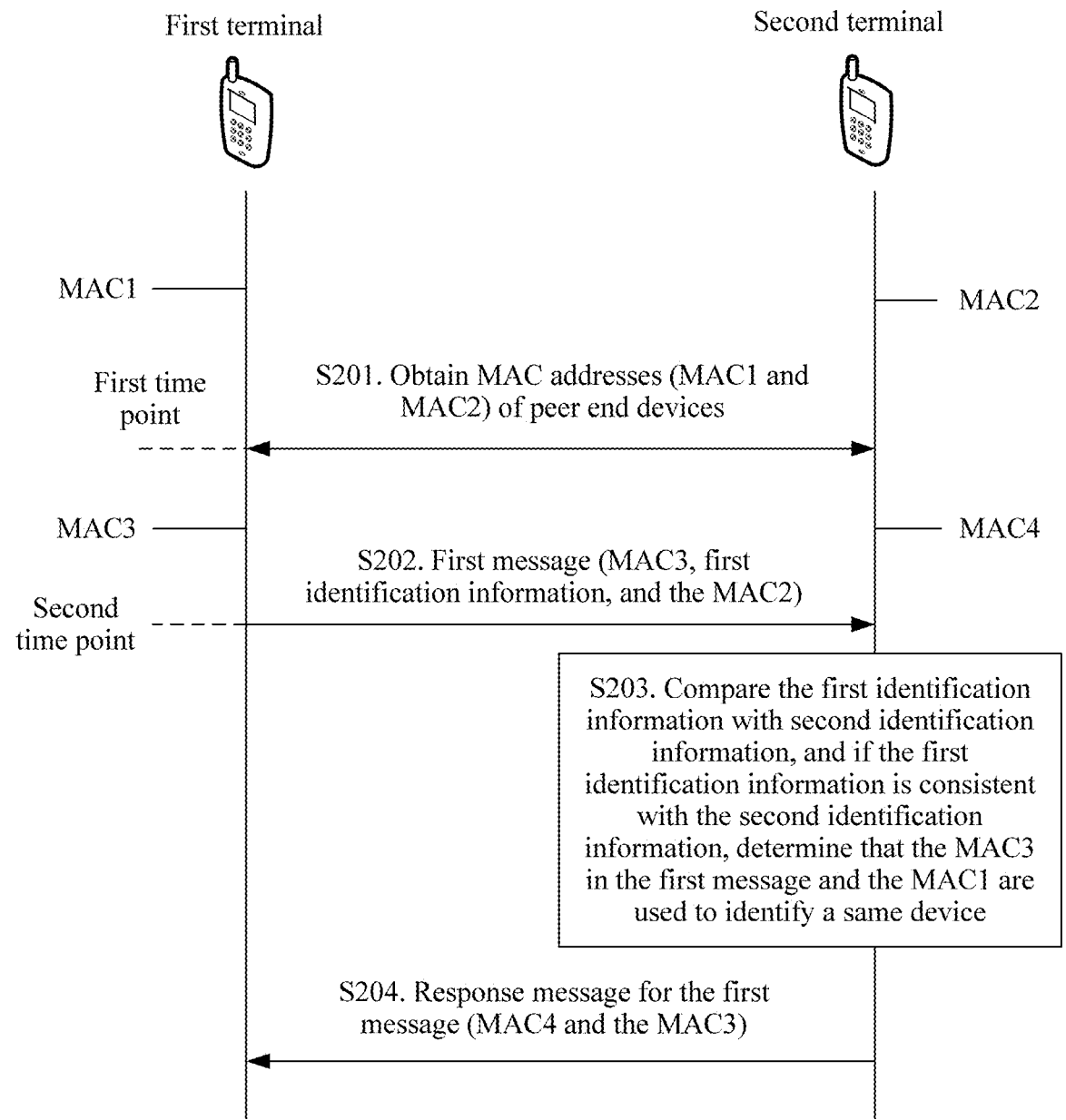
FIG. 2 is a schematic diagram of a terminal matching method according to this application.

FIG. 2 is a flowchart of a terminal matching method according to an embodiment of this application. In a technical scenario for implementation of the embodiment, a first terminal and a second terminal may be connected in a wireless manner. For example, the first terminal may be a STA in an infrastructure network, and the second terminal may be an AP in the infrastructure network. For another example, the first terminal and the second terminal may be Wi-Fi P2P (peer-to-peer) devices. For still another example, the first terminal and the second terminal may be devices based on the Wi-Fi Neighbor Awareness Networking (NAN) standard. Certainly, the first terminal may be an AP, and the second terminal may be a STA; or both the first terminal and the second terminal may be STAs or APs. Forms of the first terminal and the second terminal are not limited in a specific implementation of this application.

An association is established between the first terminal and the second terminal. For example, after exchanging service discovery function (SDF) messages, the first terminal and the second terminal learn of interface addresses of each other by using the SDF messages, and after the interface addresses of each other are learned of, it is considered that an association is established between the first terminal and the second terminal. For another example, the first terminal and the second terminal make at least one interaction, to obtain interface addresses of each other, and after the interface addresses of each other are learned of, it is considered that an association is established between the first terminal and the second terminal. An interactive manner includes but is not limited to an association (association) step or a service discovery function interaction manner.

The interface address in this embodiment of this application is an address such as a MAC address used by the first terminal or the second terminal to identify the device during wireless communication interaction. In this embodiment, that the first terminal sends a unicast message to the second terminal is used as an example for description. As shown in FIG. 2, the method includes the following steps.

Step S201: The first terminal obtains an interface address of the second terminal at a first time point, where the interface address of the second terminal at the first time point is MAC2, and an interface address of the first terminal at the first time point is MAC1; and the second terminal obtains the interface address MAC1 of the first terminal at the first time point.

In step S201, a plurality of manners may be used to obtain the interface address of the second terminal. For example, when the first terminal and the second terminal are Wi-Fi P2P devices, the first terminal may obtain the interface address of the second terminal by using at least one pair of probe request (Probe request) and probe response (Probe Response) messages. For another example, when the first terminal and the second terminal are devices based on the Wi-Fi NAN standard, after exchanging SDF messages, the first terminal and the second terminal learn of the interface addresses of each other.

Step S202: The first terminal sends a first message to the second terminal at a second time point following the first time point, where a TA (a MAC address of the first terminal) in the first message is MAC3 obtained after a change, an RA (a MAC address of the second terminal) in the first message is the MAC2, the first message may include first identification information, and the first identification information may be obtained after information including at least the MAC1, the MAC2, and secret information is calculated according to a preset irreversible algorithm. That the second terminal receives the first message at the second time point following the first time point may be understood as that the first message is received at the second time point following the first time point, or a time point a little later than the second time point (considering a transmission time of the first message).

In some cases, the second terminal is set, so that after the MAC address of the second terminal is changed from the MAC2 to MAC4, the second terminal can still receive a message with a destination address (namely, an RA) of the MAC2. For example, in a possible implementation, a virtual MAC entity is disposed in the second terminal, and a MAC address of the virtual MAC entity is set to MAC2. After receiving the first message, the virtual MAC entity transmits the first identification information to a matching module in the second terminal, for example, a multi-band SME (station management entity, station management entity) in the second terminal. When determining, based on the first identification information, a terminal corresponding to the MAC3 is a terminal corresponding to the MAC1, the matching module instructs a MAC entity with a MAC address of MAC4 to reply to a response message for the first message, and subsequently interacts with the first terminal by using the MAC entity with the MAC4.

In another possible implementation, if the second terminal is a device supporting multi-band operation (Multi-band operation), a MAC address of a second frequency band may be set to MAC2. After receiving the first message, a MAC entity in the second frequency band transmits the first identification information to a matching module, for example, an SME for the second frequency band, in the second terminal. When determining, based on the first identification information, a terminal corresponding to the MAC3 is a device corresponding to the MAC1, the matching module instructs an SME with a MAC address of MAC4 for a first frequency band to reply to a second message, and subsequently interacts with the first terminal by using the MAC entity with the MAC address of MAC4.

The irreversible algorithm in step S202 may be set by a manufacturer, for example, may be a hash algorithm such as SHA-256, SHA-1, or may be a algorithm combined with a hash algorithm. For example, after input information is calculated according to the hash algorithm, processing such as truncating or adding some bits of other information is performed on the input information. For example, a possible irreversible algorithm may be as follows:

First identification information=LSB48 bit SHA-265 (MAC1||MAC2||secret information)

The first identification information is specifically calculated in the following manner: In a result obtained through calculation after the MAC1, the MAC2, and the secret information are used as input information to be input into the SHA-256 algorithm, 48 least significant bits are used as the first identification information, where || represents combination.

In the foregoing steps, the first terminal may send the first message in a plurality of manners, for example, in a multicast manner. Specifically, a receiver address in the first message is a broadcast address or a multicast address. Certainly, the first message may be sent in a unicast manner. Specifically, when the first terminal determines that a MAC address currently used by the second terminal is still the MAC2, the first terminal may use the MAC2 as the receiver address in the first message. For example, when the first terminal needs to send the first message, the first terminal first performs passive monitoring. If the first terminal can detect a message in which the MAC2 is used as a transmitter address, the first terminal determines that the second terminal currently still uses the MAC2, and the first terminal sets the receiver address in the first message to the MAC2.

The secret information may be secret information shared by the first terminal and the second terminal, and may be obtained in any one of the following manners. Certainly, the secret information may be obtained in another manner provided that the first terminal and the second terminal can obtain same secret information. In the foregoing calculation manner, the irreversible algorithm is used for calculation, to avoid that the secret information may be deduced backwards and that Wi-Fi security is affected.

Manner A. The first terminal and the second terminal perform a 4-way handshake. The first terminal and the second terminal each generate a same pairwise transient key (PTK), and use the PTK as a seed key for subsequent generation of an encryption key and for completeness check. Then, the secret information may be obtained from the PTK. For example, the PTK is truncated or switched, or is calculated with reference to other information (for example, a fixed plaintext), to generate the secret information. For example, secret information=SHA-256 (last 64 bits of PTK||"secret info"), where || represents combination, and "secret info" is a fixed plaintext.

Manner B. The first terminal and the second terminal establish a key, and encrypt to-be-exchanged secret information by using the generated key. For example, the first terminal and the second terminal perform a 4-way-handshake, to each generate a same PTK, and the PTK is used to further generate a temporal key (TK). When information needs to be secretly transmitted between the first terminal and the second terminal, any part (the first terminal or the second terminal) may generate secret information, encrypts the secret information by using the TK, and transmits the encrypted secret information to the other part, so that the first terminal and the second terminal can share the secret information.

Manner C. According to a Diffie-Hellman (DH) key exchange algorithm or an elliptic curve Diffie-Hellman (ECDH) key exchange algorithm, the first terminal and the second terminal obtain a shared DH or ECDH key, and the DH or ECDH key is truncated or switched to obtain the secret information. For example, first 128 bits of the DH or ECDH key are truncated as the secret information.

Manner D. The first terminal and the second terminal obtain the secret information by using a trusted third party. For example, the first terminal and the second terminal obtain configuration information of a configuration device, and the configuration information includes secret information of the first terminal and the second terminal. Specifically, when the first terminal and the second terminal are devices supporting a device provisioning protocol (DPP), the trusted third party for the first terminal and the second terminal is a configuration device. When the configuration device configures the first terminal and the second terminal, the configuration device may separately add the secret information or information used to generate the secret information into configuration information sent to the first terminal and configuration information sent to the second terminal.

Step S203: The second terminal receives the first message, extracts the first identification information from the first message, compares the first identification information with second identification information, and if the first identification information is consistent with the second identification information, determines that the interface address MAC3 currently used by a sending device that sends the first message and the interface address MAC1 of a peer end device associated with the second terminal are used to identify a same device, namely, the first terminal.

The second identification information is obtained through calculation by the second terminal by inputting the MAC1, the MAC2, and the secret information into the preset irreversible algorithm.

Optionally, after step S203, the method may further include the following steps.

Step S204. The second terminal uses MAC4, obtained after a change, as a current MAC address to send a second message to the first terminal, where the second message is a response message for the first message, and is used to indicate, to the first terminal, that the second terminal is a device corresponding to the MAC2.

A MAC address change solution provided in the prior art, for example, in the patent application U.S. Pat. No. 8,009,626B2, is shown in FIG. is (namely, FIG. 1 in the patent application). A STA 103 obtains information 102 (AP_info, which may be specifically a service set identifier (service set identifier, SSID) of an AP) from an AP 101. The STA 103 generates a temporary MAC address with reference to the information 102 and a permanent address PMA (which is usually a global MAC address of the mobile device) of the STA 103 according to a preset algorithm 104 (for example, a hash algorithm). The STA 103 uses the temporary MAC address to subsequently communicate with the AP 101 (for example, perform an authentication authentication process). After receiving a message sent by the STA 103, the AP 101 matches the previously learned PMA of the STA 103 against the received temporary MAC address of the STA 103. In the solution, after associated with a network access point, a mobile device obtains information from the wireless access point, generates temporary identification information with reference to the information and a permanent address of the mobile device (which is usually a global MAC address of the mobile device), and uses the temporary identification information as an addressing identifier for communication in a network of the network access point. In the solution, only a MAC address change of a STA is considered and a MAC address change of an AP is not considered. In other words, only a MAC address change of one party is considered. If the STA updates the MAC address and the MAC address of the AP is also changed, a message sent by the STA to the AP cannot be received by the AP, and the STA and the AP are disconnected. In the technical solution shown in FIG. 2 of this application, each time an AP and a STA are associated with each other, a shared key and MAC addresses (namely, the MAC1 and the MAC2) of the AP and the STA during the association are used to generate identification information. First, a MAC address of either of the STA and the AP may be independently changed, the STA does not need to determine a new MAC address based on information sent by the AP, and the MAC address may be changed randomly. In addition, after the MAC address of either of the STA and the AP is changed, if there is a need to re-match the peer end device, the device generates identification information used to match the peer end, so that after receiving the identification information, the peer end identifies, based on the identification information, a transmitter as the previous associated peer end device, and replies to the transmitter device with a response message. After receiving the response message, the transmitter device may determine that the device sending the response message is the previous associated peer end device, thereby making a match.

Certainly, the indication to the first terminal may be an implicit indication. For example, when receiving a response message for the first message, the first terminal determines that a sending device of the response message, namely, the second terminal, is a device corresponding to the MAC2. Alternatively, the indication to the first terminal may be an explicit indication. For example, the indication, to the first terminal, that the second terminal is the device corresponding to the MAC2 may be a value of one indicator flag. Certainly, in actual application, another manner may be used for indication, for example, a special character in a plurality of continuous fields is used for indication.

Optionally, step S204 may be replaced with the following step.

Step S204-1: The second terminal sends a second message to the first terminal, where the second message is a response message (ACK) for the first message, a TA (the interface address of the second terminal) of the ACK is the MAC2, and the ACK is used to indicate, to the first terminal, that the second terminal is a device corresponding to the MAC2.

In step S204-1, the interface address of the second terminal is not changed. In the solution, the interface address of the first terminal can be changed from the MAC1 to the MAC3.

Optionally, step S204 may be replaced with the following step.

Step S204-2: The second terminal sends a second message to the first terminal, where the second message carries a third identifier, and the third identifier may be temporarily generated by the second terminal after receiving and matching the first message, or may be generated in advance. Third identification information is generated according to another irreversible algorithm based on at least the MAC1, the MAC2, and the secret information. Certainly, a generation formula different from that for generating the first identification information may be used, or a different parameter is input into the same formula. For example, a piece of special plaintext information is used in an identification information generation formula. For example, the third identification information=LSB 48 bit H265 (MAC1||MAC2||TKA|| "match found"). The special plaintext information may be "match found". The plaintext information indicates information that may be obtained by the first terminal and the second terminal.

After the first terminal receives the second message, the first terminal determines that the third identification information matches locally stored identification information. Therefore, it is determined that both the MAC4 and the MAC2 are interface addresses of the second terminal. In other words, a sending device of the second message is the second terminal. For a calculation manner of the locally stored identification information, refer to a calculation manner of the third identification information.

In the technical solution provided in this embodiment of this application, the MAC address of the first terminal is changed. In the technical solution, the first terminal may change a currently used interface address at any moment. Even if an eavesdropper can obtain the MAC address by receiving a message through an air interface, the eavesdropper cannot learn of the secret information. Therefore, the eavesdropper can obtain only user information corresponding to a MAC address in a period of time. The eavesdropper cannot obtain entire user information, and cannot track user privacy (for example, location information), thereby improving Wi-Fi security.

Optionally, before step S203, the method may further include the following steps:

The second terminal extracts an interface address MAC3 from the first message. When the MAC3 conflicts with an interface address within a transmission range of the second terminal, the second terminal sends a third message to the first terminal. The third message carries a MAC address conflict indication. If an indication carried in the third message is a MAC address conflict, the first terminal changes a currently used interface address from the MAC3 to another MAC address.

The MAC address conflict indication may be an indication value, and the indication value may be conflict or non-conflict and may be represented by 1 bit. Certainly, in actual application, the MAC address conflict indication may be described by using a status code field.

In the technical solution, a communication failure caused by a MAC address conflict can be avoided.

Optionally, after step S201, the method may further include the following step:

The first terminal uses a keying material to encrypt a message to be sent to the second terminal. The keying material may be the PTK in manner A, or may be certainly replaced with a keying material similar to the PTK in actual application.

The technical solution can reduce interaction steps between the first terminal and the second terminal. If the PTK is not used by the first terminal and the second terminal, the first terminal and the second terminal need to re-perform 4-way handshake steps to obtain a new PTK. Then the new PTK is used to encrypt the message to be sent to the second terminal. The 4-way handshake steps do not need to be performed again if the PTK in manner A is used. As a result, a quantity of information interaction times between the first terminal and the second terminal is reduced.

Figure 3:
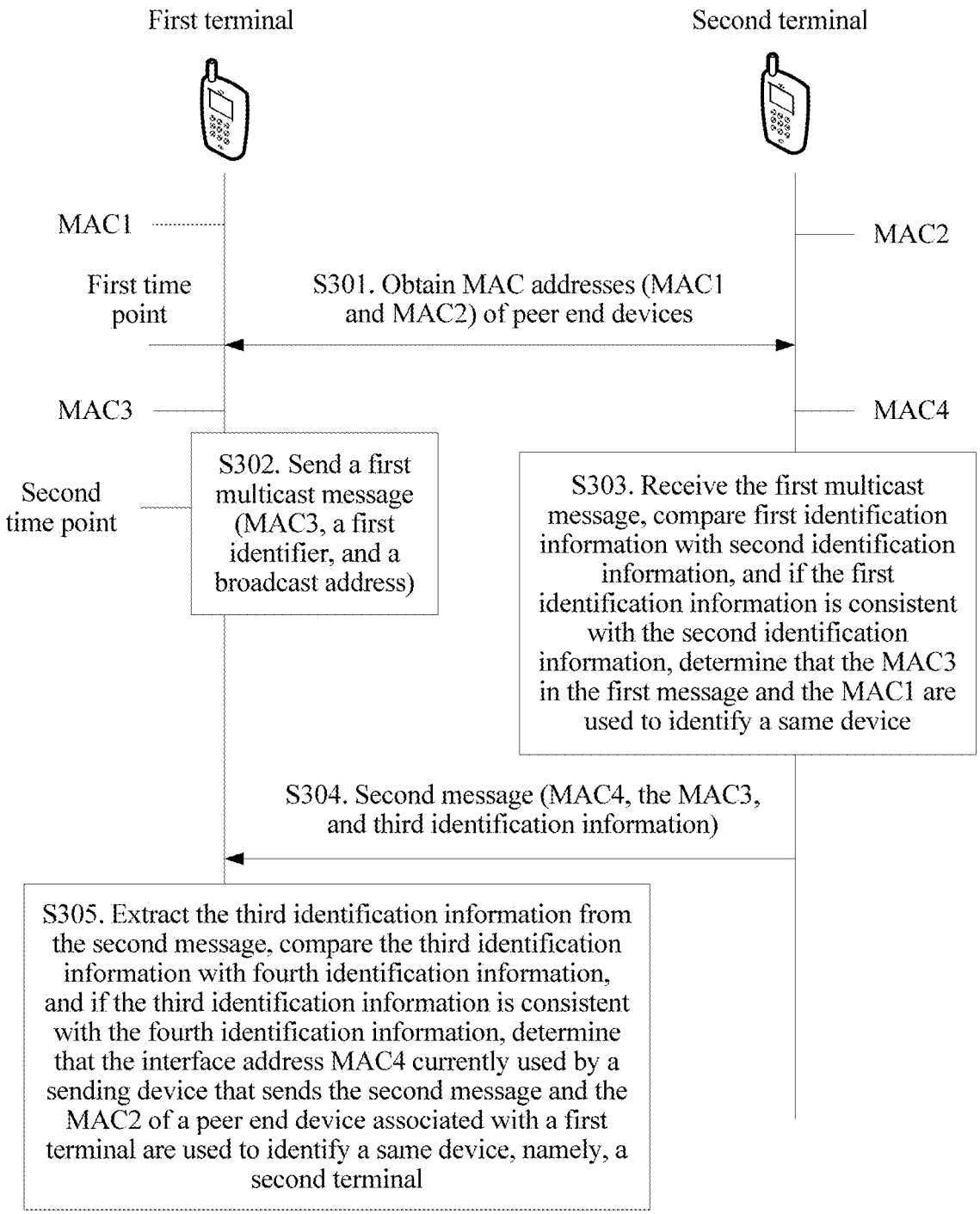
FIG. 3 is a flowchart of a terminal matching method according to another embodiment of this application.

FIG. 3 is a flowchart of a terminal matching method according to another embodiment of this application. In a technical scenario for implementation of the embodiment, a first terminal and a second terminal may be connected in a wireless manner. The first terminal may be a STA in an infrastructure network, the second terminal may be an AP in the infrastructure network, or the first terminal and the second terminal are Wi-Fi P2P (peer-to-peer) devices. The wireless manner includes but is not limited to Wi-Fi, Bluetooth (English: Bluetooth, BT), ZigBee, or the like. In this embodiment, that the first terminal sends a multicast message to the second terminal is used as an example for description. For ease of description, an interface address of the first terminal is identified as MAC1 herein, and an interface address of the second terminal in the multicast is identified as MAC2. As shown in FIG. 3, the method includes the following steps.

Step S301: The first terminal obtains the interface address of the second terminal, namely, the MAC2, at a first time point, where the interface address of the first terminal at the first time point is the MAC1; and the second terminal obtains the interface address of the first terminal, namely, the MAC1, at the first time point.

Step S302: The first terminal sends a first multicast message at a second time point following the first time point, where a TA (a MAC address of the first terminal) in the first multicast message is MAC3, and the first multicast message may include first identification information.

Step S303: The second terminal receives the first multicast message, extracts the first identification information from the first multicast message, compares the first identification information with second identification information, and if the first identification information is consistent with the second identification information, determines that an interface address MAC3 currently used by a sending device that sends the first message and MAC1 of a peer end device associated with the second terminal are used to identify a same device, namely, the first terminal.

Step S304: The second terminal sends a second message to the first terminal, where a TA (the interface address of the second terminal) in the second message is MAC4, an RA (the interface address of the first terminal) in the second message is MAC3, and the second message carries third identification information. The third identification information may be identification information obtained through calculation after the MAC1, the MAC2, and secret information are input into another preset irreversible algorithm.

The third identification information=LSB 48 bit H265 (MAC1||MAC2||TK||"match found"). Certainly, another irreversible calculation manner may be used to calculate the third identification information.

Step S305: The first terminal receives the second message, extracts the third identification information from the second message, compares the third identification information with fourth identification information, and if the third identification information is consistent with the fourth identification information, determines that an interface address MAC4 currently used by a sending device that sends the second message and MAC2 of a peer end device associated with the first terminal are used to identify a same device, namely, the second terminal.

The fourth identifier may be identification information obtained through calculation after the MAC1, the MAC2, and the secret information are input into another preset irreversible algorithm. For a specific algorithm, refer to the algorithm of the third identification information.

Optionally, the method may further include the following steps: The first terminal inputs interface addresses (the MAC3 and the MAC4) that are currently used by the first terminal and the second terminal, and the secret information into the preset irreversible algorithm, to obtain a fifth identifier, and when the MAC address of the first terminal is re-changed, the fifth identification information is used as re-changed identification information.

Optionally, after step S306, the method may further include the following steps:

The first terminal sends a fourth message to the second terminal, the fourth message may include a confirmation indication that the interface address currently used by the second terminal is the MAC4. A value of the confirmation indication may be confirmation or non-confirmation, and may be specifically represented by 1 bit. For example, 1 represents confirmation, and o represents non-confirmation. The second terminal receives the fourth message, and sends a response message for the fourth message to the first terminal when the indication value extracted from the fourth message is confirmation.

In the technical solution, a sleep-mode-caused problem that the first terminal and the second terminal cannot communicate with each other can be resolved. Specifically, after receiving the second message, the first terminal may send an ACK message to the second terminal. If the ACK message is not received by the second terminal, and the first terminal enters a sleep mode, because the first terminal has generated the second identification information before entering the sleep mode, when the first terminal wakes up and changes the MAC, the first terminal may add the second identification information to the message. However, the second terminal still uses the second identification information because the second terminal does not receive the ACK message. This causes a mismatch of identification information, and communication cannot be performed.

Figure 4:
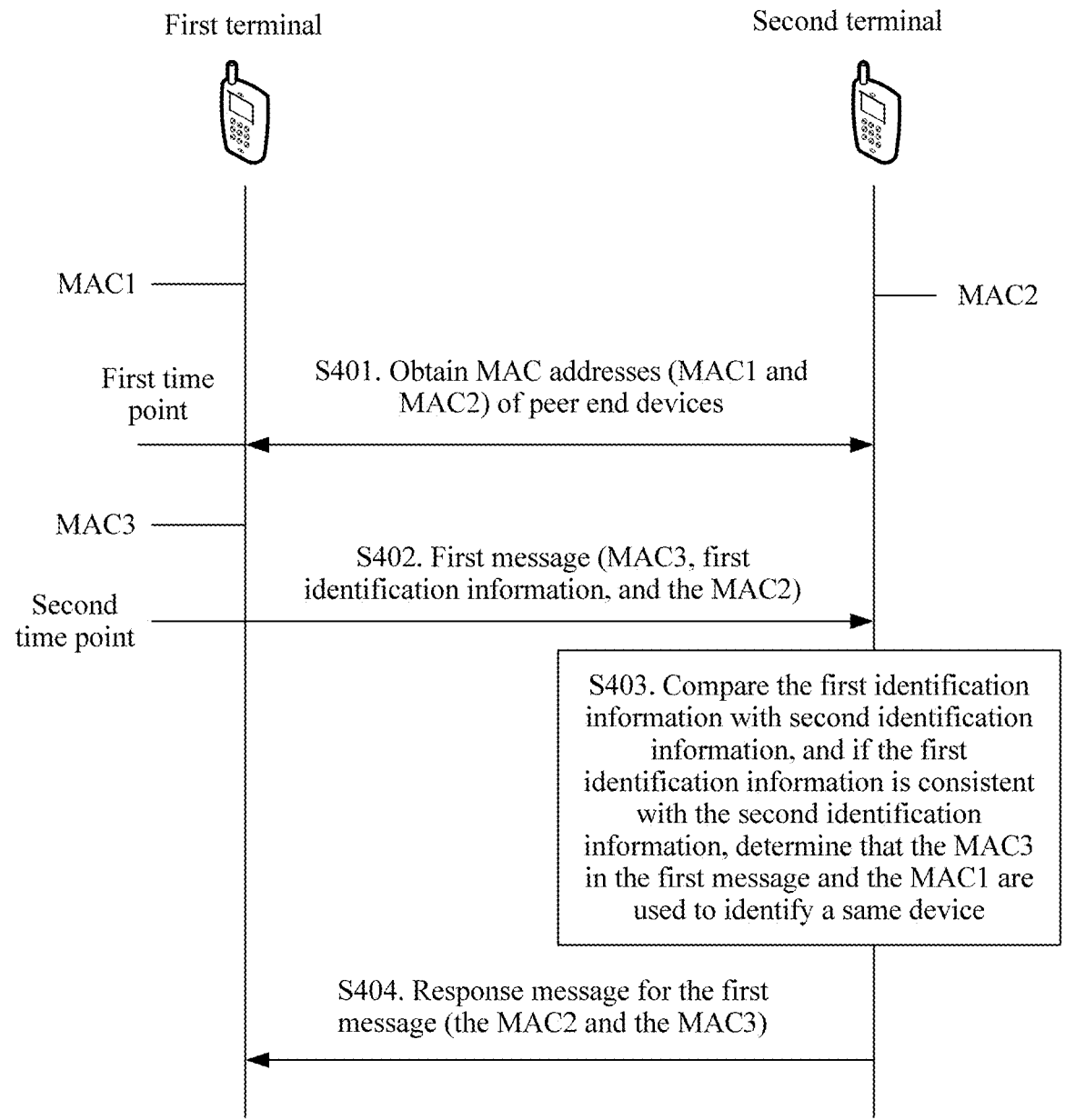
FIG. 4 is a schematic flowchart of a temporary matching method.

FIG. 4 is a flowchart of a terminal matching method according to an embodiment of this application. In a technical scenario for implementation of the embodiment, a first terminal and a second terminal may be connected in a wireless manner. The first terminal may be a STA in an infrastructure network, and the second terminal may be an AP in the infrastructure network. As shown in FIG. 4, the method includes the following steps.

Step S401: The first terminal obtains an interface address of the second terminal at a first time point, where the interface address of the second terminal at the first time point is MAC2, and an interface address of the first terminal at the first time point is MAC1; and the second terminal obtains the interface address MAC1 of the first terminal at the first time point.

Step S402: The first terminal sends a first message to the second terminal at a second time point following the first time point, where a TA (a MAC address of the first terminal) in the first message is MAC3 obtained after a change, an RA (a MAC address of the second terminal) in the first message is the MAC2, the first message may include first identification information, and the first identification information may be obtained after information including at least the MAC1, the MAC2, and secret information is calculated according to a preset irreversible algorithm.

For the preset irreversible algorithm, refer to description in step S202. Details are not described herein again.

Step S403: The second terminal receives the first message, extracts the first identification information from the first message, compares the first identification information with second identification information, and if the first identification information is consistent with the second identification information, determines that an interface address MAC3 currently used by a sending device that sends the first message and an interface address MAC1 of a peer end device associated with the second terminal are used to identify a same device, namely, the first terminal.

Step S404: The second terminal sends a response message for the first message, where an RA (a MAC address of the first terminal) in the response message for the first message is MAC3 obtained after a change, and the TA (a MAC address of the second terminal) in the first message is the MAC2.

In this application compared with the prior art, an address of the first terminal may be randomly changed without the need of determining a new MAC address based on information sent from a peer end, and a MAC address may be randomly changed.

Figure 5:
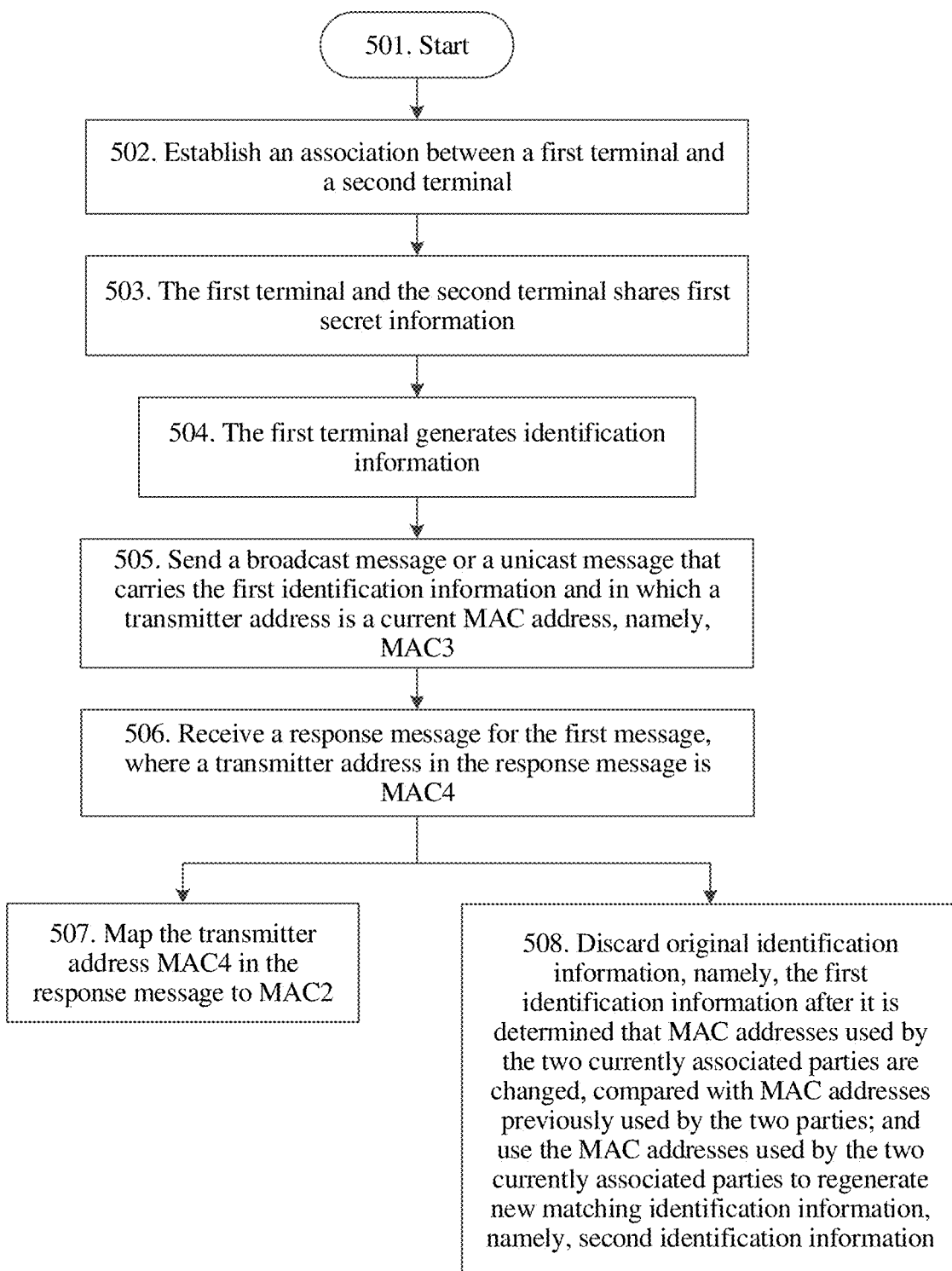
FIG. 5 is a flowchart of a terminal matching method according to still another embodiment of this application.

FIG. 5 is a flowchart of a terminal matching method according to still another embodiment of this application. In a technical scenario for implementation of the embodiment, a first terminal and a second terminal may be connected in a wireless manner. The first terminal may be a STA in an infrastructure network, and the second terminal may be an AP in the infrastructure network. The wireless manner includes but is not limited to Wi-Fi, Bluetooth (English: Bluetooth, BT), ZigBee, or the like. In this embodiment, that the first terminal sends a multicast message to the second terminal is used as an example for description. For ease of description, an interface address of the first terminal is identified as MAC1 herein, and an interface address of the second terminal in the multicast is identified as MAC2. As shown in FIG. 5, the method includes the following steps.

S501. Start the first terminal.

S502. Establish an association between the first terminal and the second terminal.

In a specific implementation of step S502, when the first terminal receives a message sent by the second terminal, and the message indicates that a STA of the second terminal supports anti-tracking (English: Anti-tracking), the first terminal may determine that the second terminal supports anti-tracking. In a subsequent process, the first terminal may start the solution in this embodiment after establishing the association with the second terminal. That the second terminal supports anti-tracking may be a default setting of the second terminal without the need of an explicit indication.

S503. The first terminal and the second terminal share first secret information.

For details of the first secret information in step S503, refer to description of the embodiment shown in FIG. 2.

S504. The first terminal generates identification information, namely, first identification information.

In a specific implementation of step S504, the first terminal generates the identification information according to an irreversible algorithm based on at least a current MAC address (namely, the MAC2) of the second terminal, a current MAC address (namely, the MAC1) of the first terminal, and the first secret information. The identification information is carried when the first terminal subsequently sends a first message, so that a peer end of the first message, namely, the second terminal, performs identity matching on the first terminal based on the identification information. When the first terminal is associated with a plurality of peer end devices, namely, a plurality of terminals (for example, a third terminal and a fourth terminal), the first terminal remains a list including identification information corresponding to the plurality of terminals, and the first terminal keeps, when sending the first message, an element information retrieval list including a mapping relationship between the following parameters (for example, a MAC address of the second terminal or the current MAC address of the first terminal) and the identification information. It should be noted that the identification information may be generated when the first terminal needs to send the first message, or may be generated before at least one of the first terminal and the second terminal changes a MAC address.

S505. The first terminal sends a first message in a broadcast or unicast manner, where the first message carries the first identification information, and a transmitter address in the first message is a changed MAC address of the first terminal, namely, MAC3.

For an implementation in which the first terminal unicasts the first message, refer to the method in step S202. Details are not described herein again.

S506. The first terminal receives a response message for the first message, where a transmitter address in the response message is MAC4.

Step S507 may be performed after step S506. Further, optionally, step S508 may be further performed.

S507. The first terminal maps the transmitter address MAC4 in the response message to MAC2, namely, determining that the MAC4 and the MAC2 are used to identify a same device, namely, the second terminal.

S508. Determine that MAC addresses used by the two currently associated parties (the first terminal and the second terminal) are changed, compared with MAC addresses previously used by the two parties (for example, at least one of the MAC1 and the MAC2 is changed; in this embodiment, both the MAC1 and the MAC2 are changed), discard original identification information, namely, the first identification information, and use the MAC addresses (for example, the MAC3 and the MAC4 at this moment) used by the two currently associated parties to regenerate new matching identification information, namely, second identification information.

The current association is relative to a previous association, and may be specifically understood as follows: When the first terminal confirms reception of the response message for the first message, and the transmitter address in the response message is the MAC4, the first terminal determines that a device corresponding to the MAC4 is the previously associated second terminal corresponding to the MAC2. Therefore, the first terminal may directly reuse information (connection information exchanged in step S502, for example, a security key, a sequence counter, a data packet value counter, association information, and robust security network association (English: robust security network association, RSNA)) obtained when the first terminal is previously associated with the second terminal, and then use the information to continue to communicate with the second terminal. It may be understood that the two parties make an association again, namely, the current association.

Optionally, the second terminal may discard the original identification information after receiving the response message (for example, a new message such as a second message, or a response message for the response message for the first message) sent by the first terminal, and use MAC addresses used by the two currently associated parties to regenerate the new matching identification information.

The second identification information may be generated based on a current MAC address of the first terminal, a current MAC address of the second terminal, and the first secret information according to a preset irreversible algorithm. A scenario in which the MAC address of the first terminal is changed from the previous MAC1 to the current MAC3 and an address of the second terminal is still the MAC2 is used as an example. In this case, the second identification information may be generated based on the MAC3, the MAC2, and the first secret information according to the preset irreversible algorithm. In the technical solution, identification information may be updated based on a current MAC address when a MAC address of either of the two parties is changed. This ensures synchronization of the identification information. In the technical solution provided in another embodiment of this application, the MAC address of the first terminal is changed. In the technical solution, the first terminal may change a currently used interface address at any moment. Even if an eavesdropper can obtain the MAC address by receiving a message through an air interface, the eavesdropper cannot learn of the secret information. Therefore, the eavesdropper can obtain only user information corresponding to a MAC address in a period of time. The eavesdropper cannot obtain entire user information, and cannot track user privacy (for example, location information), thereby improving Wi-Fi security.

Figure 6A:
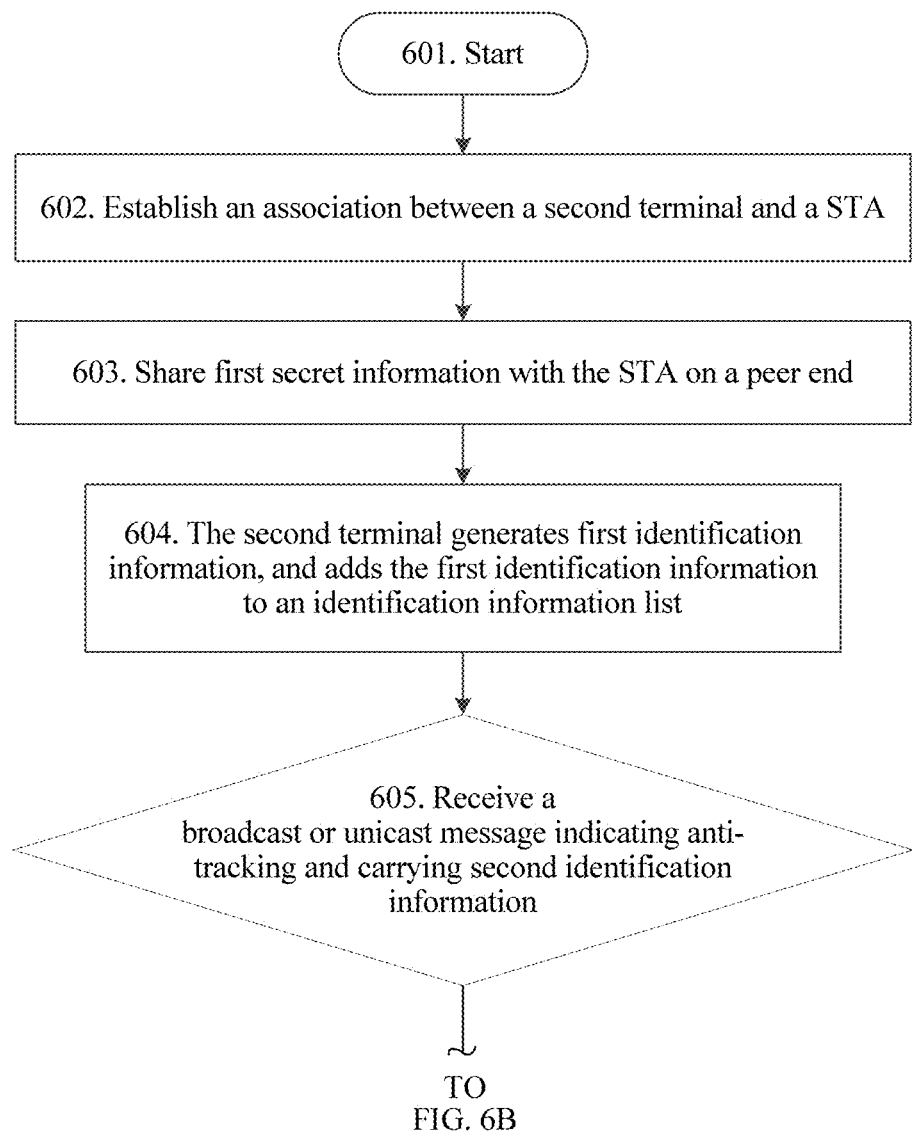
FIG. 6A and FIG. 6B are a flowchart of a terminal matching method according to yet another embodiment of this application.
Figure 6B:
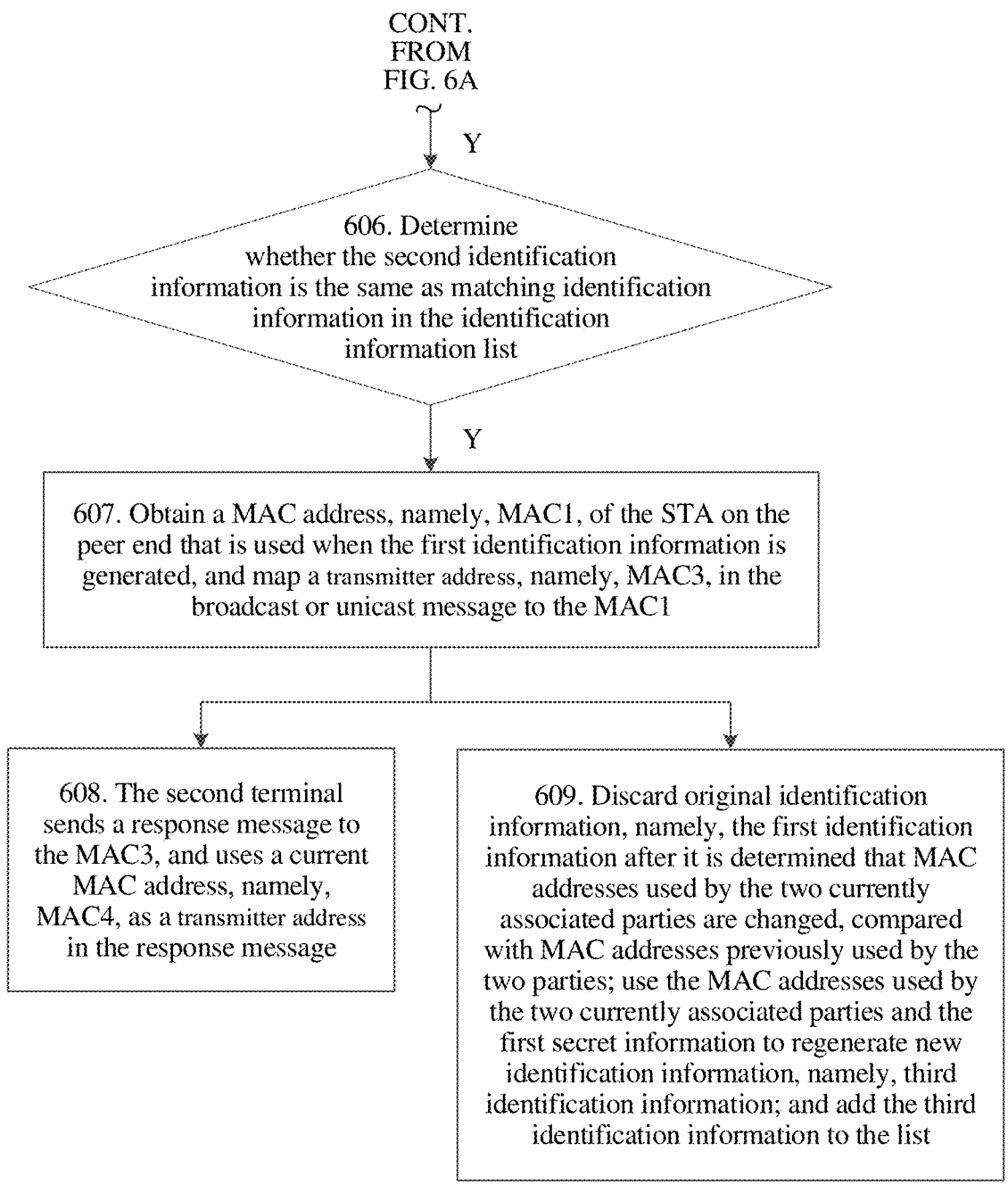

FIG. 6A and FIG. 6B are a flowchart of a terminal matching method according to yet another embodiment of this application. In a technical scenario for implementation of the embodiment, a first terminal and a second terminal may be connected in a wireless manner. The first terminal may be a STA in an infrastructure network, and the second terminal may be an AP in the infrastructure network. The second terminal may have a plurality of peer end devices, and the second terminal remains a list including identification information corresponding to the plurality of peer end devices. As shown in FIG. 6A and FIG. 6B, the method includes the following steps.

Step S601: Start the second terminal.

Step S602: Establish an association between the second terminal and an anti-tracking STA.

Step S603: The second terminal and the STA share first secret information.

Step S604: The second terminal generates first identification information, and adds the first identification information to an identification information list (list) recorded on the second terminal.

The identification information generated by the second terminal may be obtained through calculation by inputting MAC1, MAC2, and the first secret information into a preset irreversible algorithm. The irreversible algorithm may be set by a manufacturer, for example, may be a hash algorithm such as SHA-256, SHA-1, or may be a algorithm combined with a hash algorithm. For example, after input information is calculated according to the hash algorithm, processing such as truncating or adding some bits of other information is performed on the input information. For example, a possible irreversible algorithm may be as follows: First identification information=LSB 48 bit SHA-265 (MAC1||MAC2||first secret information). In other words, in a result obtained through calculation after the MAC1, the MAC2, and the first secret information are input into the SHA-256 algorithm, 48 least significant bits are used as the first identification information, where || represents combination.

Step S605: The second terminal receives a broadcast or unicast message carrying second identification information.

Step S606: The second terminal determines whether the second identification information is the same as matching identification information in the identification information list.

Step S607: If the second identification information is the same as the first identification information in the list, extract a MAC address (namely, MAC1) of a STA of a peer end used when the first identification information is generated, map a transmitter address (namely, MAC3) in the broadcast or unicast message to the MAC1, and determine that the MAC3 and the MAC1 are used to identify a same peer end device.

Step S608: The second terminal sends a response message for the broadcast or unicast message to the STA, and uses a current MAC address (namely, MAC4) as a transmitter address of the response message.

Step S609: Discard original identification information, namely, the first identification information after it is determined that MAC addresses used by the two currently associated parties are changed, compared with MAC addresses previously used by the two parties; use the MAC addresses used by the two currently associated parties (for example, the MAC3 and the MAC4 at this moment) and the first secret information to regenerate new identification information, namely, third identification information; and add the third identification information to the list.

That the second terminal determines that the MAC addresses used by the two currently associated parties are changed, compared with the MAC addresses previously used by the two associated parties may be understood as follows: FIG. 2 is used as an example, after step S204, after the second terminal receives an acknowledgement ACK message of the response message for the first message sent by the first terminal (alternatively, FIG. 3 is used as an example, and the terminal receives an acknowledgement message for the second message sent by the first terminal), the second terminal may determine that MAC addresses of the two associated parties are the MAC3 and the MAC4, and are changed, compared with the MAC addresses previously used by the two associated parties.

For a condition of the current association, refer to description in step S508. Details are not described herein again.

In the technical solution provided in the foregoing embodiment, when a plurality of STAs are connected to an AP, the AP establishes an identification information list, and may update identification information in the identification information list based on whether a current MAC address of the AP or the STA is changed. Therefore, the technical solution supports information interaction security of a plurality of STAs, and improves Wi-Fi security.

The identification information in this embodiment of this application may be carried in the following field.

Figures 1, 7:
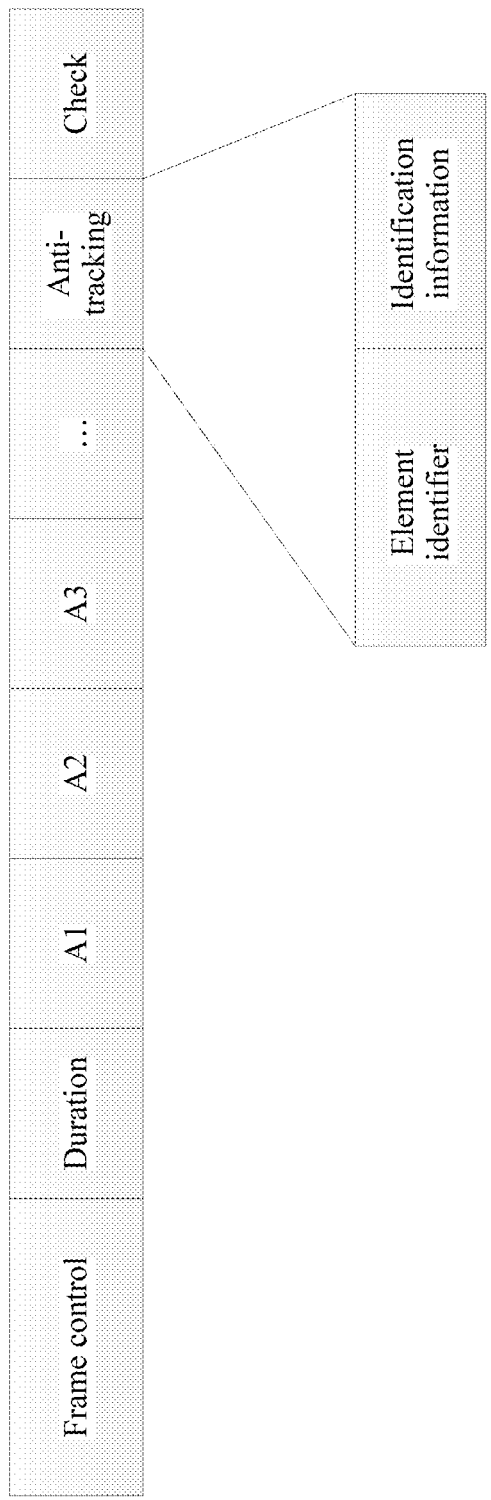
FIG. 7-1 is a schematic diagram of a format of a message according to this application.
Figures 2, 7:
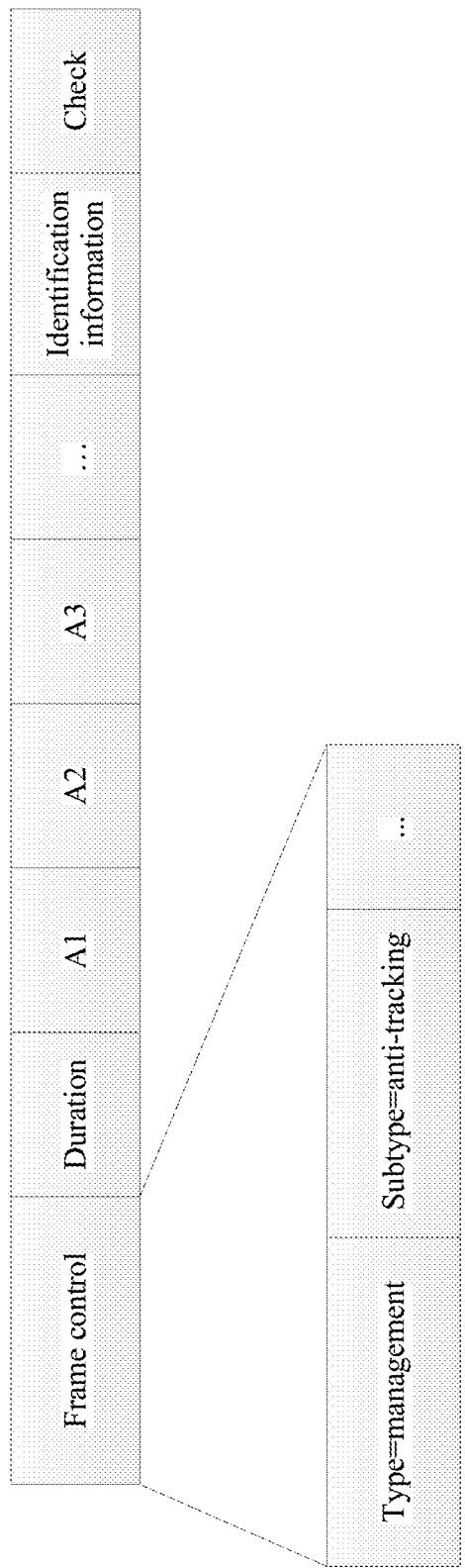
Figures 3, 7:
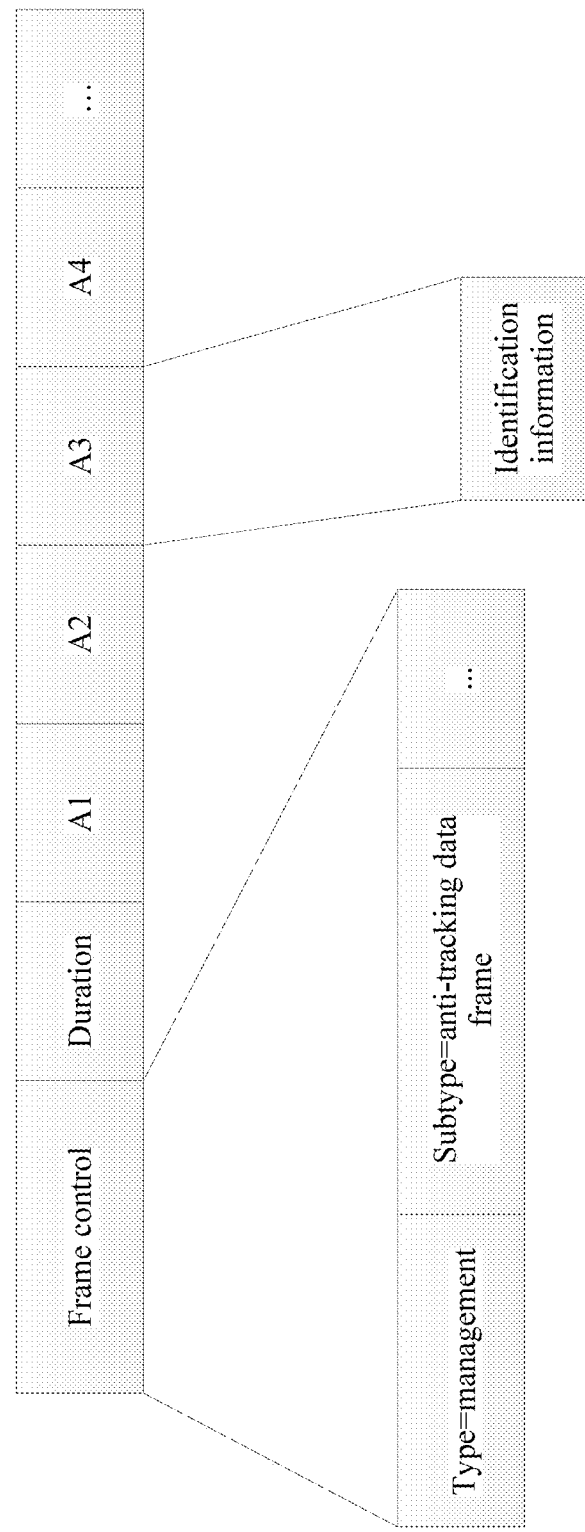

When the message is a management frame, the identification information (including the first identification information, the second identification information, the third identification information, fourth identification information, or fifth identification information) is carried in a defined information element (IE) in a load part of the management frame. For example, as shown in FIG. 7-1, an anti-tracking information element anti-tracking IE is defined, and the anti-tracking information element includes an element identifier (Element ID) and identification information. For example, the management frame may be a probe request or a probe response.

When the message is a management message or a control message, FIG. 7-2 shows an example of a management frame. The management frame may be replaced with a control frame. A subtype field of the management frame indicates that the frame is an anti-tracking (Anti-tracking) management frame, and a load part of the management frame includes the identification information. Alternatively, a public action frame is used to define an anti-tracking public action frame, and a load part of the anti-tracking public action frame includes the identification information.

When the message is a data frame, the message is shown in FIG. 7-3. For example, a subtype field of the data frame indicates that the data frame is an anti-tracking data frame, and an A3 (address3) or an A4 (address4) of the data frame is set to the identification information or 6-byte information including the identification information. It should be noted that the identification information is carried in the A3 only when the first terminal is a source device (source device) of the data frame. Based on a definition of the data frame, an A1 field and an A2 field respectively represent a source MAC and a destination MAC of the data frame. If the first terminal is not the source device of the data frame, the A3 has a specific meaning, and the data frame may not be normally sent if the A3 is changed. Likewise, the identification information is carried in the A4 only when the second terminal is a destination device (destination device) of the data frame, because if the second terminal is a non-destination device, the data frame may not be normally sent when the identification information is carried in the A4.

Figure 8:
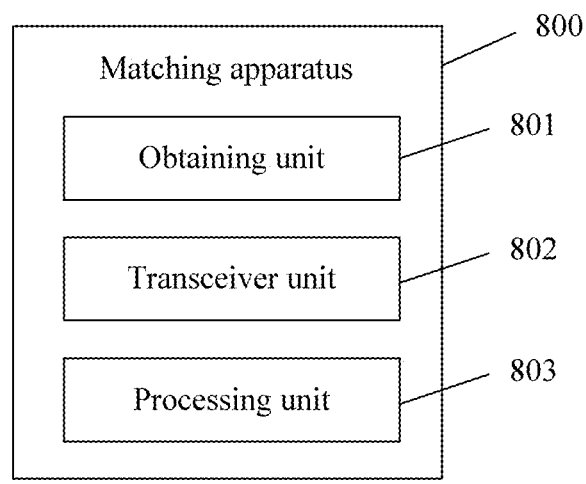
FIG. 8 is a schematic structural diagram of a matching apparatus according to an embodiment of this application.

FIG. 8 shows a matching apparatus 800 according to this application. The matching apparatus 800 is disposed in a second terminal. The matching apparatus 800 may be configured to perform operations of the second terminal in FIG. 2 and FIG. 3. The apparatus includes: an obtaining unit 801, configured to obtain an interface address of a first terminal at a first time point, where the interface address of the first terminal is a first media access control address MAC1, and an interface address of the second terminal at the first time point is a second media access control address MAC2; a transceiver unit 802, configured to receive, at a second time point following the first time point, a first message sent by the first terminal, where a transmitter address, namely, the interface address of the first terminal, included in the first message is a third media access control address MAC3 obtained after a change, the first message includes first identification information, the first identification information is information obtained through calculation after the first terminal inputs the MAC1, the MAC2, and secret information into a first preset irreversible algorithm, and the secret information is information shared by the first terminal and the second terminal; and a processing unit 803, configured to: compare the first identification information with a second identification information, and if the first identification information is consistent with the second identification information, the second terminal determines that the MAC3 in the first message and the MAC1 that is obtained by the second terminal are used to identify a same device, where the same device is the first terminal.

The second identification information is information obtained through calculation after the processing unit inputs the MAC1, the MAC2, and the secret information into the first preset irreversible algorithm.

The transceiver unit 802 is further configured to send a response message for the first message to the first terminal, where the response message carries a fourth media access control address MAC4, and the MAC4 is a changed interface address of the second terminal.

For a technical effect and detailed technical solutions of the matching apparatus provided in this application, refer to description of the embodiment shown in FIG. 2 or FIG. 3. The processing unit and the transceiver unit may be configured to perform the detailed solutions shown in FIG. 2 or FIG. 3. Details are not described herein again.

Figure 9:
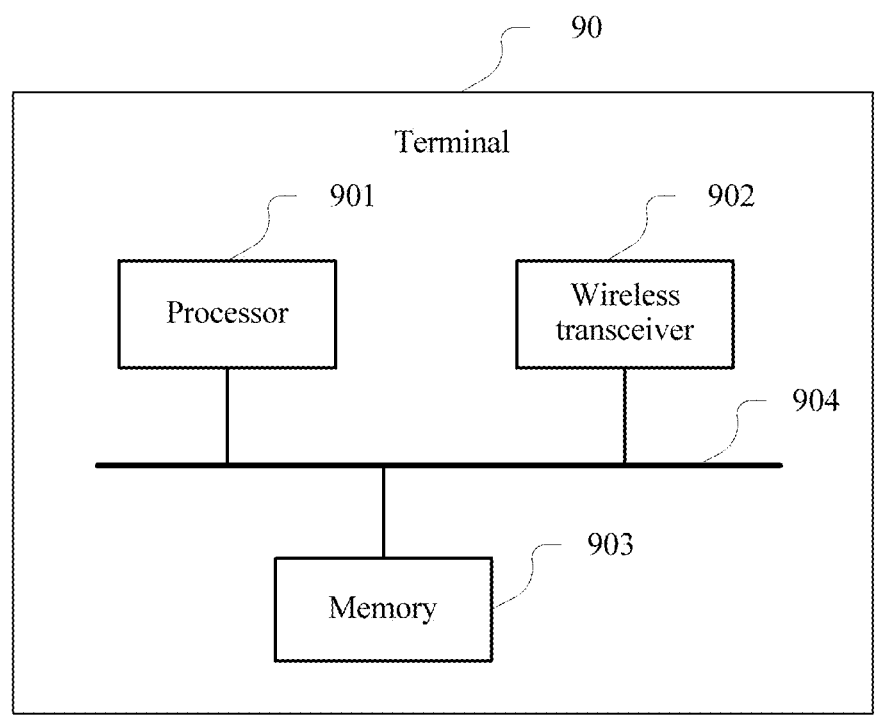
FIG. 9 is a schematic diagram of hardware of a terminal according to an embodiment of this application.

FIG. 9 shows a terminal. The terminal is a second terminal and includes a processor 901, a wireless transceiver 902, a memory 903, and a bus 904. The transceiver 902 is configured to send data to or receive data from an external device. There may be one or more processors 901. In some embodiments of this application, the processor 901, the memory 902, and the transceiver 903 may be connected to each other by using the bus 904 or in another manner. A terminal 90 may be configured to perform steps of the second terminal in FIG. 2 or FIG. 3. For meanings and examples of terms in this embodiment, refer to the embodiment corresponding to FIG. 2 or FIG. 3. Details are not described herein again.

The memory 903 stores program code. The processor 901 is configured to invoke the program code stored in the memory 903, to perform the following operations:

The processor 901 is configured to obtain an interface address of a first terminal at a first time point, where the interface address of the first terminal is a first media access control address MAC1, and an interface address of the second terminal is a second media access control address MAC2.

The transceiver 902 is configured to receive, at a second time point following the first time point, a first message sent by the first terminal, where a transmitter address, namely, the interface address of the first terminal, included in the first message is a third media access control address MAC3 obtained after a change, the first message includes first identification information, the first identification information is information obtained through calculation after the first terminal inputs the MAC1, the MAC2, and secret information into a first preset irreversible algorithm, and the secret information is information shared by the first terminal and the second terminal.

The processor 901 is configured to: compare the first identification information with second identification information, and if the first identification information is consistent with the second identification information, the second terminal determines that the MAC3 in the first message and the MAC1 that is obtained by the second terminal are used to identify a same device, where the same device is the first terminal.

The second identification information is information obtained through calculation after the processor 901 inputs the MAC1, the MAC2, and the secret information into the first preset irreversible algorithm.

The transceiver 902 is further configured to send a response message for the first message to the first terminal, where the response message carries a third media access control address MAC4, and the MAC4 is a changed interface address of the second terminal.

It should be noted that the processor 901 herein may be one processing component or a collective term of a plurality of processing components. For example, the process component may be a central processing unit (CPU), or an application specific integrated circuit (ASIC), or may be configured as one or more integrated circuits implementing this embodiment of this application, for example, one or more microprocessors (DSP) or one or more field programmable gate arrays (FPGA).

The memory 903 may be a storage apparatus or a collective term of a plurality of storage components, and is configured to store executable program code or store a parameter, data, or the like required for running an application program or an apparatus. The memory 903 may include a random access memory (RAM) or a non-volatile memory, such as a magnetic disk storage or a flash memory (Flash).

The bus 904 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 9, but this does not mean that there is only one bus or only one type of bus.

The terminal may further include an input/output apparatus connected to the bus 904, to connect other parts such as the processor 901 by using the bus. The input/output apparatus may provide an input interface for an operator, so that the operator selects a distributed control item at the input interface; or may provide another interface, to connect another external device through the interface.

A person of ordinary skill in the art may understand that all or some of the processes of the methods in the embodiments may be implemented by a computer program instructing related hardware. The program may be stored in a computer readable storage medium. When the program runs, the processes in the method embodiments are performed. The storage medium may include: a magnetic disk, an optical disc, a read-only memory (ROM), or a random access memory (RAM).

What are disclosed above are merely example embodiments of this application, and certainly are not intended to limit the protection scope of this application. A person of ordinary skill in the art may understand that all or some of processes that implement the foregoing embodiments and equivalent modifications made in accordance with the claims of this application shall fall within the scope of this application.

The invention claimed is:

1. A method, comprising:
obtaining, by a second terminal, a first interface address of a first terminal at a first time point, wherein the first interface address of the first terminal at the first time point is a first media access control address (MAC1), and a second interface address of the second terminal at the first time point is a second media access control address (MAC2);

receiving, by the second terminal at a second time point following the first time point, a first message sent by the first terminal, wherein a transmitter address in the first message is a third media access control address (MAC3) obtained after a change, wherein the first message comprises first identification information obtained through first calculation after the first terminal inputs the MAC1, the MAC2, and secret information into a first preset irreversible algorithm, and wherein the secret information is information shared by the first terminal and the second terminal;

comparing, by the second terminal, the first identification information with second identification information;

determining, by the second terminal, that the MAC3 in the first message and the MAC1 obtained by the second terminal are used to identify a same device based on determination that the first identification information is consistent with the second identification information, wherein the same device is the first terminal, and wherein the second identification information is obtained through second calculation after the second terminal inputs the MAC1, the MAC2, and the secret information into the first preset irreversible algorithm; and sending, by the second terminal, a first response message for the first message to the first terminal, wherein the first response message carries a fourth media access control address (MAC4), and the MAC4 is a changed interface address of the second terminal; and wherein the first response message for the first message carries third identification information, and wherein the third identification information is obtained through third calculation after the second terminal inputs the MAC1, the MAC2, and the secret information into a second preset irreversible algorithm.

2. The method according to claim 1, further comprising:
after the sending the first response message:
receiving, by the second terminal, a second message sent by the first terminal, wherein the second message comprises a confirmation indication that the first terminal determines that the MAC4 is the second interface address of the second terminal; and
sending, by the second terminal, a second response message for the second message to the first terminal, wherein the second message comprises the confirmation indication.

3. The method according to claim 2, further comprising:
after the obtaining the first interface address:
detecting, by the second terminal, whether the MAC1 conflicts with a media access control address within a communication range of the second terminal; and
sending a third message to the first terminal based on detection of a conflict of the MAC1 within the communication range of the second terminal, wherein the third message carries a MAC address conflict indication.

4. The method according to claim 3,
wherein the first message, the second message, or the third message is a management frame, wherein the first identification information, the second identification information, the third identification information, or fourth identification information is added to an anti-tracking information element of a load part in the management frame, and wherein the anti-tracking information element comprises an element identifier; or
wherein the first message, the second message, or the third message is the management frame or a control frame, wherein a subtype field of the management frame or the control frame indicates that the management frame or the control frame is of an anti-tracking type, and wherein the first identification information, the second identification information, the third identification information, or the fourth identification information is added to a load part of the management frame or the control frame.

5. The method according to claim 1, wherein the first terminal is a source device, the first message is a data frame, a subtype field of the data frame indicates that the data frame is an anti-tracking data frame, and the first identification information is added to an A3 field of the data frame.

6. The method according to claim 1, wherein the second terminal is a destination device, the first response message for the first message is a data frame, a subtype field of the data frame indicates that the data frame is an anti-tracking data frame, and the second identification information is added to an A4 field of the data frame.

7. A second terminal, comprising:
a processor;
a wireless transceiver;
a memory; and
a bus,
wherein the processor, the wireless transceiver, and the memory are connected to each other by using the bus,
wherein the processor is configured to:
obtain a first interface address of a first terminal at a first time point, wherein the first interface address of the first terminal is a first media access control address (MAC1), and a second interface address of the second terminal at the first time point is a second media access control address (MAC2);
wherein the wireless transceiver is configured to:
receive, at a second time point following the first time point, a first message sent by the first terminal, wherein a transmitter address in the first message is a third media access control address (MAC3) obtained after a change, wherein the first message comprises first identification information obtained through first calculation after the first terminal inputs the MAC1, the MAC2, and secret information into a first preset irreversible algorithm, and wherein the secret information is information shared by the first terminal and the second terminal;
wherein the processor is further configured to:
compare the first identification information with second identification information;
determine that the MAC3 in the first message and the MAC1 obtained by the second terminal are used to identify a same device based on determination that the first identification information is consistent with the second identification information, wherein the same device is the first terminal, and wherein the second identification information is obtained through second calculation after the processor inputs the MAC1, the MAC2, and the secret information into the first preset irreversible algorithm, and
wherein the wireless transceiver is further configured to:
send a first response message for the first message to the first terminal, wherein the first response message carries a fourth media access control address (MAC4), and the MAC4 is a changed interface address of the second terminal; and
wherein the first response message for the first message carries third identification information, and wherein the third identification information is obtained through third calculation after the second terminal inputs the MAC1, the MAC2, and the secret information into a second preset irreversible algorithm.

8. The second terminal according to claim 7, wherein the wireless transceiver is further configured to:
after the first response message is sent:
receive a second message sent by the first terminal, wherein the second message comprises a confirmation indication that the first terminal determines that the MAC4 is the second interface address of the second terminal; and
send a second response message for the second message to the first terminal, wherein the second message comprises the confirmation indication.

9. The second terminal according to claim 8, wherein the processor is further configured to:
after the first interface address is obtained:
detect whether the MAC1 conflicts with a media access control address within a communication range of the second terminal, and wherein the wireless transceiver is further configured to:
send a third message to the first terminal based on detection of a conflict of the MAC1 within the communication range of the second terminal, wherein the third message carries a MAC address conflict indication.

10. The second terminal according to claim 9, wherein the processor is further configured to:
add the first identification information, the second identification information, the third identification information, or fourth identification information to an anti-tracking information element of a load part in a management frame, wherein the anti-tracking information element comprises an element identifier, and wherein the first message, the second message, or the third message is the management frame; or
add the first identification information, the second identification information, the third identification information, or the fourth identification information to a load part of the management frame or a control frame, wherein the first message, the second message, or the third message is the management frame or the control frame, and wherein a subtype field of the management frame or the control frame indicates that the management frame or the control frame is of an anti-tracking type.

11. The second terminal according to claim 7, wherein the processor is further configured to:
add the first identification information to an A3 field of a data frame, wherein the first terminal is a source device, the first message is the data frame, and a subtype field of the data frame indicates that the data frame is an anti-tracking data frame.

12. The second terminal according to claim 7, wherein the processor is further configured to:
add the first identification information to an A3 field of a data frame, wherein the first terminal is a source device, the first message is the data frame, and a subtype field of the data frame indicates that the data frame is an anti-tracking data frame.

13. The second terminal according to claim 7, wherein the processor is further configured to:
add the first identification information to an A4 field of a data frame, wherein the first terminal is a source device, the first message is the data frame, and a subtype field of the data frame indicates that the data frame is an anti-tracking data frame.

14. A non-transitory computer-readable medium having instructions stored thereon that, when executed by a second terminal, cause the second terminal to perform operations, the operations comprising:
obtaining a first interface address of a first terminal at a first time point, wherein the first interface address of the first terminal at the first time point is a first media access control address (MAC1), and a second interface address of the second terminal at the first time point is a second media access control address (MAC2);
receiving, at a second time point following the first time point, a first message sent by the first terminal, wherein a transmitter address in the first message is a third media access control address (MAC3) obtained after a change, wherein the first message comprises first identification information obtained through first calculation after the first terminal inputs the MAC1, the MAC2, and secret information into a first preset irreversible algorithm, and wherein the secret information is information shared by the first terminal and the second terminal;
comparing the first identification information with second identification information;
determining that the MAC3 in the first message and the MAC1 obtained by the second terminal are used to identify a same device based on determination that the first identification information is consistent with the second identification information, wherein the same device is the first terminal, and wherein the second identification information is obtained through second calculation after the second terminal inputs the MAC1, the MAC2, and the secret information into the first preset irreversible algorithm; and
sending a first response message for the first message to the first terminal, wherein the first response message carries a fourth media access control address (MAC4), and the MAC4 is a changed interface address of the second terminal; and
wherein the first response message for the first message carries third identification information, and wherein the third identification information is obtained through third calculation after the second terminal inputs the MAC1, the MAC2, and the secret information into a second preset irreversible algorithm.

15. The non-transitory computer-readable medium according to claim 14, the operations further comprising:
after the sending the first response message:
receiving, by the second terminal, a second message sent by the first terminal, wherein the second message comprises a confirmation indication that the first terminal determines that the MAC4 is the second interface address of the second terminal; and
sending, by the second terminal, a second response message for the second message to the first terminal, wherein the second message comprises the confirmation indication.

16. The non-transitory computer-readable medium according to claim 15, the operations further comprising:
after the obtaining the first interface address:
detecting, by the second terminal, whether the MAC1 conflicts with a media access control address within a communication range of the second terminal; and
sending a third message to the first terminal based on detection of a conflict of the MAC1 within the communication range of the second terminal, wherein the third message carries a MAC address conflict indication.

17. The non-transitory computer-readable medium according to claim 16,
- wherein the first message, the second message, or the third message is a management frame, wherein the first identification information, the second identification information, the third identification information, or fourth identification information is added to an anti-tracking information element of a load part in the management frame, and wherein the anti-tracking information element comprises an element identifier; or
- wherein the first message, the second message, or the third message is the management frame or a control frame, wherein a subtype field of the management frame or the control frame indicates that the management frame or the control frame is of an anti-tracking type, and wherein the first identification information, the second identification information, the third identification information, or the fourth identification information is added to a load part of the management frame or the control frame.

\* \* \* \* \*